United States Patent [19]
Pollitzer

[11] 3,917,540
[45] Nov. 4, 1975

[54] CATALYST FOR HYDROGENATION AND DEHYDROGENATION OF HYDROCARBONS

[75] Inventor: Ernest L. Pollitzer, Skokie, Ill.

[73] Assignee: Universal Oil Products Company, Des Plaines, Ill.

[22] Filed: July 19, 1974

[21] Appl. No.: 490,172

Related U.S. Application Data

[60] Continuation-in-part of Ser. No. 30,990, April 22, 1970, abandoned, which is a division of Ser. No. 814,174, April 7, 1969, Pat. No. 3,529,029, which is a continuation-in-part of Ser. No. 723,886, April 24, 1968, abandoned.

[52] U.S. Cl.............. 252/466 PT; 208/138; 260/667
[51] Int. Cl.$^2$......................................... B01J 23/62
[58] Field of Search................ 252/466 PT; 208/138; 260/667

[56] References Cited
UNITED STATES PATENTS
3,432,565   3/1969   Kouwenhoven et al. ........... 260/667

OTHER PUBLICATIONS
Broadbent et al., Rhenium Catalysts, J. of Organic Chemistry, Vol. 27, (1962), pp. 4400–4402.

Primary Examiner—W. J. Shine
Attorney, Agent, or Firm—James R. Hoatson, Jr.; Robert W. Erickson; William H. Page, II

[57]         ABSTRACT

A novel catalytic composite comprising a Group VIII noble metal component, an alkalinous metal component and a Group VII-B metal component, having an atomic number greater than 25, on an alumina carrier is utilized in the hydrogenation of aromatic hydrocarbons to the corresponding cycloparaffins and in the dehydrogenation of normal paraffins to the corresponding mono-olefins. With respect to the former, there is negligible yield loss to both gaseous waste material and to acyclic hydrocarbons as a result of ring-opening; in the latter, there is afforded a significant decrease in the quantity of non-normal hydrocarbons in the product stream. The particularly preferred catalytic composite comprises a platinum or palladium component, a lithium or potassium component and a rhenium component.

3 Claims, No Drawings

CATALYST FOR HYDROGENATION AND DEHYDROGENATION OF HYDROCARBONS

RELATED APPLICATIONS

The present application is a Continuation-In-Part of my copending application Ser. No. 030,990, filed Apr. 22, 1970, and now abandoned which copending application is a Division of application Ser. No. 814,174, filed Apr. 7, 1969, and now U.S. Pat. No. 3,529,029, issued Sep. 15, 1970, which patent is, in turn, a Continuation-In-Part of application Ser. No. 723,886, filed Apr. 24, 1968, and now abandoned, all the teachings of which applications are incorporated herein by specific reference thereto.

APPLICABILITY OF INVENTION

The present invention encompasses a catalytic composite and its use in processes for effecting the hydrogenation of aromatic hydrocarbons and the dehydrogenation of paraffinic hydrocarbons. With respect to the aromatic hydrocarbons, these include benzene, toluene, the various xylenes, naphthalenes, etc., which are hydrogenated to form the corresponding cyclic paraffins. In addition to these aromatic hydrocarbons, the present catalyst affords advantages to the hydrogenation of substituted aromatic hydrocarbons such as ethylbenzene, di-ethylbenzene, and various mono-, di-, and tri-substituted aromatic hydrocarbons, etc. The corresponding cyclic paraffins, resulting from the hydrogenation of the aromatic nuclei, include compounds such cyclohexane, mono-, di-, tri-substituted cyclohexanes, Decalin (decahydronaphthalene) Tetralin (tetrahydronaphthalene), etc. Cycloparaffinic hydrocarbons are extensively utilized in commercial industries for a wide variety of purposes. For example, cyclohexane is used in exceedingly large quantities in the manufacture of nylon, and as a solvent for various fats, oils, waxes, etc. Cyclohexane is often employed in the manufacture of crude rubber and various resins, and is used as a component of paint and varnish remover. Mono-, di-, and tri-substituted cyclohexanes can be utilized as starting materials in various organic syntheses. Decalin is used as an organic solvent for heavier fats and oils, as a stain remover, as a substitute for turpentine, etc. Tetralin finds use as a solvent for various resinates, for asphaltic material, as an ingredient in shoe polish, etc. The greater majority of uses dictate that the cycloparaffin, for example cyclohexane, exist in a substantially pure state, and particularly uncontaminated by the corresponding aromatic hydrocarbon.

While applicable to the dehydrogenation of paraffinic hydrocarbons, containing from about 4 to about 20 carbon atoms per molecule, to produce the corresponding mono-olefinic hydrocarbons, my invention is particularly advantageous for the dehydrogenation of long chain normal paraffins containing from about 10 to about 18 carbon atoms per molecule. Such normal paraffins include decane, undecane, dodecane, tridecane, tetradecane, pentadecane, hexadecane, heptadecane, octadecane, and mixtures thereof. Uses of long chain mono-olefins are numerous, and are applied with success in a wide variety of industries including petroleum, petrochemical, pharmaceutical, plastics, etc. For example, mono-olefins having from 10 to about 18 carbon atoms per molecule are utilized as the intermediate olefin for use in the alkylation of benzene to prepare sulfonated detergents, or in the alkylation of phenol to prepare oxy-ethylated non-ionic detergents. Other uses include direct sulfation to form biodegradable alkyl sulfates; direct sulfonation with sodium bisulfite to prepare biodegradable sulfonates; hydration to alcohols which are employed to produce plasticizers, or synthetic lube oils; and, in the preparation of heavy metal sulfonate salts of dilong chain alkyl benzene, which are excellent lube oil detergents.

OBJECTS AND EMBODIMENTS

A principal object of the present invention is to provide a novel catalytic composite containing a Group VIII noble metal component, a Group VII-B metal component, an alkalinous metal component and an alumina carrier material. A corollary objective is to provide a non-acidic, substantially halogen-free catalyst suitable for hydrogenating aromatic hydrocarbons to the corresponding cycloparaffinic hydrocarbons, and for dehydrogenating normal paraffinic hydrocarbons to the corresponding mono-olefinic hydrocarbons.

Still another object of my invention involves providing a catalyst capable of possessing a high degree of stability and selectivity in a process for the hydrogenation of aromatic hydrocarbons contaminated by the inclusion of sulfurous compounds.

Therefore, in one embodiment, my invention affords a catalytic composite of alumina, a Group VIII noble metal component, a Group VII-B metal component having an atomic number greater than about 25 and an alkalinous metal component.

In a specific embodiment, my invention encompasses a non acid-acting catalytic composite of alumina, a Group VIII noble metal, an alkalinous metal selected from the group consisting of lithium, sodium, potassium, rubidium, cesium, beryllium, magnesium, calcium, strontium, barium and mixtures thereof, and a Group VII-B metal having an atomic number greater than 25, said composite containing, on an elemental basis, Group VIII noble metal in an amount of from 0.01% to about 2.0% by weight, Group VII-B metal in an amount of from 0.01% to about 2.0% by weight and alkalinous metal in an amount of from 0.01% to about 1.5% by weight.

Other embodiments of my invention are directed toward processing techniques, operating conditions, as well as various preferred compositions of the catalytic composite. Such additional objects and embodiments will become evident from the following, more detailed description of my invention. In one such other embodiment, the Group VII-B metal exhibits an oxidation state, within the catalytic composite, of plus-one (+1), or less.

PRIOR ART

In the interest of brevity, the discussion relevant to hydrogenation will be directed toward the conversion of benzene to cyclohexane. It is understood that the catalyst of the present invention may be utilized to advantage in hydrogenation processes regardless of the character of the aromatic hydrocarbon which is to be converted. Although cyclic paraffins are readily found in various petroleum hydrocarbon fractions and/or distillates, and often in substantial quantities, it is very difficult to effect recovery thereof by distillation due to the tendency of the cyclic paraffins to form azeotropic mixtures. On the other hand, however, a series of distillation and/or extraction procedures may be utilized to obtain substantially pure aromatic hydrocarbons. For example, a benzene-containing fraction, such as a full boiling range naphtha (150°F. to about 400°F.) may be subjected to fractional distillation to provide a selected heart-cut which contains the benzene. The benzene-containing heart-cut is then subjected to a solvent extraction process which separates the benzene from the normal or iso-paraffinic components, as well as the naphthenes contained therein. Benzene is readily recovered from the selected solvent by way of distillation. In this manner, a benzene concentrate, as well as other aromatic hydrocarbons, may be obtained in a purity of 99.0%, or higher.

Heretofore, the hydrogenation of aromatic hydrocarbons has been effected with a nickel-containing catalytic composite at hydrogenation conditions. Nickel-containing catalyst is disadvantageous in many respects, and especially from the standpoint that nickel is quite sensitive to the sulfurous compounds contained in the benzene concentrate. The nickel-containing catalysts become deactivated through an inter-reaction with the sulfurous compounds, whereby the nickel component is converted into a sulfide. Notwithstanding that the formation of nickel sulfide is at least partially reversible, even under the most conducive conditions the reaction is not reversible to the extent that a sufficient quantity of the nickel component becomes catalytically active for effecting additional hydrogenation. The nickel-containing catalyst, although fairly active initially, does not possess sufficient stability.

Some processes, described in the prior art, rely upon a catalytic composite containing a Group VIII noble metal component, particularly a platinum and/or palladium component. Although the Group VIII noble metal component, for example platinum, is also converted into platinum sulfide, the prior art indicates that the reaction is more readily reversible than that involving the nickel component, and that the reaction tends to reverse as the temperature of the catalyst is increased. However, an increase in reaction temperature promotes a corresponding increase in reactions other than hydrogenation, whereby the aromatic nuclei are converted to hydrocarbons other than the desired cyclo-paraffins. Since the rate at which the formation of platinum sulfide reverses is proportional to the quantity of hydrogen sulfide within the reaction zone, a prior art solution to the problem is a hydrogen sulfide removal system. This generally involves intricate treating facilities including a caustic wash treatment followed by water washing to remove traces of caustic from the hydrogen-enriched gaseous phase intended for recycle to the reaction zone. Such a system is subject to extremely careful control to insure that excessive quantities of caustic are not carried into the reaction zone, thereby upsetting the delicate balance of the catalytic composite, notwithstanding that the catalytic composite includes an alkali metal component for the purpose of attenuating the inherent cracking activity possessed by Group VIII noble metals, and which results from residual halogen as hereafter set forth. It should further be noted that the prior art use of the alkali metal component is preferably limited to a quantity less than 1.0% by weight, and more often in the range of about 0.01% to about 0.75% by weight. It is generally conceded that concentrations of the alkali metal component, in excess of about 0.75% by weight tend to upset the balance between inhibiting the occurrence of side reactions, and imparting the desired degree of activity and stability to the platinum-containing catalyst.

The preferred catalyst of my invention is of such a character that the inherent cracking activity is attenuated to a more substantial degree without adversely affecting the capability of the catalyst with respect to hydrogenation activity and selectivity. This is accomplished by the incorporation of a Group VII-B metal component, having an atomic number greater than 25. Thus, the catalytic composite contains a rhenium component and/or a technetium component, to the exclusion of a manganese component, the latter being incapable of providing the required hydrogenation activity and stability. Furthermore, the catalytic composite appears to possess an exceptional degree of sulfur tolerability to the extent that intricate, exotic hydrogen sulfide removal facilities are not critical to successful operation.

Briefly, the catalyst of the present invention comprises alumina, 0.01% to about 2.0% by weight of a Group VIII noble metal, 0.01% to about 2.0% by weight of a Group VII-B noble metal, having an atomic number greater than 25, and 0.01% to about 1.5% by weight of an alkalinous metal. Further, it is preferred that the weight ratio of said Group VII-B metal to said Group VIII noble metal is in the range of about 0.01:1.0 to 2.5:1.0, and that the Group VII-B metal exhibit an oxidation state of +1, or less — i.e. +1, 0 or −1. The U.S. Pat. No. 3,432,565 (Cl. 260–667), a catalyst of 0.1% to 10.0% by weight of a Group VIII metal, less than 0.6% by weight of an alkali metal and alumina is disclosed for the hydrogenation of aromatics contained in a kerosene fraction. Conspicuously absent is any recognition of the cojoint incorporation of a Group VII-B metal, its beneficial effect upon aromatic hydrogenation and its unique effect when dehydrogenating paraffinic hydrocarbons to the corresponding mono-olefins. As hereinafter specifically set forth, a catalyst containing 0.6% lithium, 0.375% platinum and 0.375% rhenium afforded a yield increase of about 26.6% normal olefins over that resulting from a catalyst containing 0.6% lithium and 1.0% platinum, without rhenium.

In Broadbent, et al. "Rhenium Catalysts", *Journal or Organic Chemistry*, Vol. 27 (1962), pp. 4400–4402, various unsaturated organic compounds, including benzene, were hydrogenated at pressures ranging from 194 to about 359 atmospheres (2,850 to 5,280 psig.) using an unsupported rhenium (III) Oxide catalyst, in which the rhenium exhibits a +3 oxidation state. The authors' conclusion, based upon some 24 hydrogenation tests, is that the rhenium (III) oxide is the effective catalyst and not some reduced product. Again, there is no recognition of the cojoint use of rhenium and a Group VIII noble metal. In fact, it is concluded that rhenium in an oxidation state less than +3 would be ineffective. As hereinafter specifically indicated, a stoichiometrically-based pretreatment analysis indicates that the rhenium has an oxidation state of +2, or less, while the platinum exhibits an oxidation state of +2, or less.

DESCRIPTION OF CATALYTIC COMPOSITES

The catalytic composites preferably comprise metallic components selected from the metals, and compounds thereof, of Groups VII-B, I-A, II-A and VIII of the Periodic Table. Thus, in accordance with the *Periodic Table of the Elements*, E. H. Sargent & Co., 1964, suitable metallic components are selected from the group consisting of ruthenium, rhodium, palladium, osmium, iridium, platinum, being the noble metals of Group VIII, lithium, sodium, potassium, rubidium, cesium, beryllium, magnesium, calcium, strontium, and, in some instances, barium. It should be noted that the metals selected from Group VII-B, technetium and rhenium, have atomic numbers greater than 25. The use of manganese in the catalytic composite does not result in the desired degree of hydrogenation selectivity and catalyst stability.

While neither the precise composition, other than as previously stated, nor the method of manufacturing the catalyst is an essential element of my invention, certain considerations are preferred. For example, since the fresh feed to the present process is an aromatic concentrate, and the desired normally liquid produce effluent is a cycloparaffinic concentrate, or a normal paraffin concentrate, and the desired produce is the corresponding mono-olefin, the catalytic composite should not possess the propensity to promote ring-opening, isomerization and/or hydrocracking reactions. Thus, the catalytic composite employed herein is substantially free from "acid-acting" components, and is herein referred to as being "non-acidic", or "non acid-acting". For example, the catalytically active metallic components hereinabove set forth, are preferably combined with a non-siliceous, substantially halogen-free carrier material such as alumina. A substantially "halogen-free" composite is one wherein halogen is not intentionally added as a component, and, in those instances where a halogen component (chloroplatinic acid) is employed in the catalyst manufacturing process, steps are taken to reduce the halogen content to the lowest possible level. Prior art indicates that the halogen content can be thus reduced to a level below about 0.1% by weight, but seldom below about 0.05%.

The alumina carrier material may be prepared in any suitable manner, and may be activated prior to use by one or more treatments including drying, calcination, steaming, etc. Since the precise method of preparing the carrier material is not essential to my invention, detailed discussion is not believed necessary. Briefly, the carrier material may be formed in any desired shape such as spheres, pills, cakes, extrudates, powders, granules, etc. A particularly preferred form is the sphere; spheres may be continuously manufactured by the well-known oil-drop method which comprises forming an alumina hydrosol by any of the techniques taught in the art, combining the hydrosol with a suitable gelling agent and dropping the resultant mixture into an oil bath maintained at elevated temperatures. Further details for the production of spherical alumina particles may be found in U.S. Pat. No. 2,620,314, issued to James Hoekstra.

As hereinbefore stated, a halogen-containing compound is often utilized during one or more steps of the overall catalyst manufacturing technique. For example, alumina is commonly prepared by a method which involves digesting substantially pure aluminum metal in hydrochloric acid, and a Group VIII noble metal is often impregnated throughout the finished alumina through the use of, for example, chloropalladic acid or chloroplatinic acid. Since it is extremely difficult to reduce the concentration of combined halogen to a level substantially below about 0.1% by weight, the undesirable acidity imparted thereby is countered and inhibited through the use of the alkalinous metal component.

The alkalinous metal component, employed for the purpose of attenuating the acid-function possessed by residual halogen, by the carrier material, and/or by the Group VIII noble metal component, is selected from the group of lithium, sodium, potassium, rubidium, cesium, beryllium, magnesium, calcium, strontium, barium and mixtures thereof, with lithium and potassium being preferred. Regardless of the particular state in which the component exists within the final catalytic composite, the quantities thereof, from about 0.01% to about 1.5% by weight, and preferably from about 0.1% to about 1.0%, are calculated as if the component existed in the elemental state. It is a general procedure to incorporate the alkalinous metal component during the preparation of the carrier material; therefore, the carrier material is often referred to as, for example, "lithiated alumina". Another method, sometimes preferred, calls for impregnating the alkali metal last in order to facilitate distribution of the other metal components.

The Group VIII noble metal component, selected from the group of ruthenium, osmium, rhodium, iridium, palladium, platinum and mixtures thereof, is used in an amount of from about 0.01% to about 2.0% by weight, calculated as if existing in the elemental state. The Group VII-B metallic component, selected from technetium and/or rhenium, is also utilized in an amount within the range of from about 0.01% to about 2.0% by weight. Both the Group VIII noble metal component and the Group VII-B metallic component may be incorporated within the catalytic composite in any suitable manner including co-precipitation with the carrier, or impregnation of the carrier material with a suitable watersoluble compound of the metal. Following the incorporation of the metallic components, for example by way of impregnation, the carrier material is dried and subjected to a high temperature calcination technique, which technique is thoroughly described within the prior art. A particularly preferred catalytic composite comprises alumina, platinum or palladium, lithium and rhenium. Excellent results are achieved with a catalyst containing from about 0.1% to about 1.0% by weight of lithium, 0.3% to about 0.9% by weight of platinum or palladium, and 0.1% to about 0.8% by weight of rhenium.

While advantageous results are achieved with a catalytic composite having a Group VII-B/noble metal weight ratio in the range of from about 0.01:1 to about 2.50:1, it is preferred that the catalyst contain an excess of the noble metal component compared to the Group VII-B metal component. The final catalytic composite will generally be dried at a temperature of from about 200°F. to about 600°F., for a period of from about 2 to about 24 hours. The dried composite is then calcined at a temperature of from about 700°F. to about 1100°F., and for a period of about 0.5 to about 10 hours.

Although the catalytic composite will undergo reduction under the operating conditions experienced in a processing unit, it is a sound practice, and preferred to subject the resultant calcined composite to substantially waterfree reduction as a step in the manufacturing procedure. In either situation, the rhenium will indicate an oxidation state of +2, or less. When the reduction step constitutes an integral part of the manufacturing technique, the oxidation state of the rhenium will be +1, or less. Preferably, substantially pure and dry hydrogen — i.e. less than about 5.0 ppm. of water by volume — is employed. The composite is contacted with hydrogen at a temperature of about 800°F. to about 1200°F. for a period of ½ to 10 hours.

A catalyst containing 0.375% platinum and 0.375% rhenium by weight, calculated as the elemental metals, after being calcined, or oxidized as above set forth, was subjected to a series of reductions and oxidations in a stoichiometrically-designed analysis to determine the oxidation state of the rhenium component. One gram of catalyst is treated, at one atmosphere, with a known slug — generally 2.0 cc. — of either oxygen, or 17.0% hydrogen in helium. The equivalents consumed per mole of metal (EMM) is stoichiometrically calculated and the oxidation state of the metal determined thereby.

After outgassing the catalyst sample for one-half hour at 500°C. (932°F.), the following series of "slugs" were passed therethrough:

I. 17% $H_2$ in Helium at 600°C. (1112°F.), EMM=7.0
II. Oxygen at 25°C. (77°F.), EMM=1.5
III. Hydrogen at 25°C. (77°F.), EMM=1.5
IV. Oxygen at 25°C. (77°F.), EMM=1.5
V. Oxygen at 200°C. (392°F.), EMM=1.0
VI. Oxygen at 400°C. (752°F.), EMM=0
VII. Oxygen at 600°C. (1112°F.), EMM=0
VIII. 17.0% $H_2$ in Helium at 600°C. (1112°F.), EMM=2.5

At this point, the composite was oxidized in air for 16 hours at a temperature of 500°C. (932°F.), and two additional slugs passed therethrough. This results in +3 rhenium and $PtO_2$.

IX. 17.0% $H_2$ in Helium at 600°C. (1112°F.), EMM=4.0
X. Oxygen at 400°C. (752°F.), EMM=6.0

The following indicates the determined oxidation state of the metals: (I) $Re^-$ (or $Re°$ with absorbed hydrogen), Pt; (II) Re°, PtO; (III) Re°, PtH; (IV) Re°, PtO; (V) +2 Re, PtO; (VI) +2 Re, PtO; (VII) +2 Re, PtO; (VIII) $Re^-$ (or Re° with absorbed hydrogen), Pt; (IX) $Re^-$ (or Re° with absorbed hydrogen), Pt; and, (X) +7 Re, $PtO_2$.

In the examples hereinafter described, the catalyst manufacturing technique included a hydrogen reduction at 560°C. (1040°F.), indicating Re°, or −1 rhenium, or a mixture thereof.

PROCESS CONDITIONS AND TECHNIQUES

Although the hydrogenation process may be conducted in a single reaction zone, more advantageous utilization involves a plurality of reaction zones, the flow through which is in part in series, and in part in parallel. Although any suitable number of reaction zones may be employed, the use of three reaction zones is generally preferred. Two reaction zones do not appear to result in as complete a conversion of the benzene to cyclohexane without the use of unnecessarily high temperatures which inherently result in the undesirable side reactions. More than three reaction zones does not appear to yield additional benefits, and are, therefore, considered uneconomically feasible. Although not necessary, the total volume of catalyst employed in the process is often divided into approximately equal portions, each of which is disposed within one of the three reaction zones. Similarly, the process is facilitated when the total fresh benzene feed is added in three approximately equal portions, one each to the inlet of each of the three reaction zones. While the benzene, therefore, passes in parallel flow through the reaction zones, the hydrogen and cyclohexane recycle (the source of which is hereinafter set forth) passes in series flow through the reaction zones. Since the reaction is exothermic in nature, this particular series-parallel flow pattern permits the temperature rise in each zone to be limited to an allowable value, by restricting the quantity of benzene in the reactant mixture introduced to an individual reaction zone.

Approximately one-third of the total benzene fresh feed is commingled with recycled cyclohexane and hydrogen, a part of the latter being recycled from the last reaction zone, the remainder supplemented by make-up hydrogen, and is charged to the first reaction zone. The mixture is previously heated to a temperature such that the maximum catalyst bed temperature is 200° to 800°F. Cyclohexane is utilized in an amount approximately three times the volumetric quantity of benzene charged to the reaction zone; the hydrogen is employed in an amount sufficient to yield a mole ratio of hydrogen to cyclohexane, in the effluent from the last reaction zone, not substantially less than about 4.0:1. The total effluent leaves the first reaction zone at a temperature of about 500°F., and although a temperature profile indicates a peak temperature as high as 700°F., the utilization of the particular catalyst has been found to yield little or no hydrocracking whereby undesirable lower-boiling straight-chain hydrocarbons are formed.

The effluent from the first reaction zone is commingled with another portion of benzene, again equal to approximately one-third of the total fresh benzene feed to the process. This mixture is then cooled, where necessary, to a temperature of about 300°F., prior to entering the second reaction zone. Similarly, the effluent from the second reaction zone is commingled with approximately one-third of the total benzene charge, subsequently cooled to a temperature of about 300°F., and is introduced into the last reaction zone. The liquid hourly space velocity relates to the total quantity of benzene in parallel flow to the reaction zones, and the total amount of catalyst disposed in the plurality of reaction zones, and is generally in the range of from about 1.0 to about 10.0. The total effluent from the last reaction zone in the series is passed into a high pressure separator, at a temperature of from about 60°F. to about 140°F., wherein it is separated into two phases. A hydrogen-rich vaporous phase is removed from the high pressure separator and recirculated to the first reaction zone as a portion of the hydrogen necessary for the reaction; at least a portion of the liquid phase, being substantially pure cyclohexane, is recycled to the inlet of the first reaction zone in an amount such that the mole ratio of cyclohexane to the total quantity of benzene passing in parallel flow to said reaction zones is in the range of from about 0.5:1 to about 10:1. The remaining portion of the cyclohexane-containing product stream is passed to suitable fractionation/distillation facilities in order to recover the cyclohexane in a substantially pure state.

The hydrogenation process, using the catalyst of my invention, when effected in accordance with the conditions stated herein, is capable of producing a cyclohexane stream of greater than 99.5% purity, in yields of 100.0% for an extended period of time, and without the need for frequent expensive shut-downs necessitated by a deactivated catalyst.

Since the hydrogenation of aromatic hydrocarbons, to the corresponding cycloparaffins, involves the consumption of at least 3 moles of hydrogen per mole of aromatic hydrocarbon, make-up hydrogen is introduced to the system from any suitable source. Catalytic reforming processes produce large quantities of a highly concentrated, hydrogen rich gas stream, and thus, constitute one of the more suitable sources of make-up hydrogen. Although the reaction zones may be maintained under an imposed pressure within the range of about 100 psig. to about 2000 psig., it is advantageous to utilize an intermediate pressure of about 300 to about 1000 psig. Higher pressures tend to promote the hydrogenation of the aromatic nuclei, but likewise increase the degree of hydrocracking and ring-opening whereby low molecular weight, straight-chain paraffinic hydrocarbons are formed. The formation of such light hydrocarbons results in a decrease in the volumetric yield of cyclohexane.

With respect to the dehydrogenation of paraffinic hydrocarbons, to produce corresponding mono-olefinic hydrocarbons, the reaction conditions will be generally less severe in order to inhibit side reactions resulting in undesired products. This is especially the situation when the feed stock contains long-chain normal paraffins. Although beneficial results are obtained at temperatures of 750°F. to about 1100°F., it is preferred to operate within the intermediate range of about 800°F. to about 930°F. Operating pressures will be above about 10 psig., with an upper limit of about 100 psig. In most instances, the reaction zone pressure will be in the range of 15.0 to 40.0 psig. The pressure will be maintained via compressive hydrogen recycle in an amount such that the mole ratio of hydrogen to hydrocarbon charge is about 10.0:1.0 to about 15.0:1.0. The hydrocarbon charge rate is such that the liquid hourly space velocity is in the range of 12.0 to about 40.0.

The following examples are presented to illustrate further the utility of the catalyst of the present invention and also to indicate the benefits afforded through the utilization thereof.

HYDROGENATION EXAMPLE

The catalyst utilized is a substantially halogenfree alumina carrier material combined with about 0.375% by weight of rhenium, 0.375% by weight of platinum and about 0.80% by weight of lithium. The incorporation of the platinum and rhenium involves the simultaneous impregnation of the alumina particles with a single aqueous impregnating solution of perrhenic acid and chloroplatinic acid. Following a series of water washing procedures, to reduce the chloride level to as low a value as possible, drying and calcination, the composite is re-impregnated with an aqueous solution of lithium nitrate. The finally impregnated spherical particles are dried at a temperature of about 300°F. for a period of about 4 hours, calcined for a period of about 5 hours at a temperature of about 1100°F., and in an atmosphere of air, and reduced in hydrogen at 1040°F.

For the purposes of illustration, the process will be described in connection with a commercially-scaled unit having a fresh benzene feed capacity approximating 2000 barrels per day. In the instant illustration, the fresh benzene feed rate is about 1940 barrels per day, and it is intended to maximize the yield of cyclohexane. The fresh benzene feed, recovered from a solvent extraction unit, contains approximately 20.0 ppm. by weight of sulfur; however, no provision is made for recycle gas scrubbing for hydrogen sulfide removal. The commercial unit is designed such that the fresh benzene feed is introduced in parallel flow to three reactors: the feed to the first reactor is in an amount of 690 barrels per day (113.98 moles per hour); that to the second reaction zone is 700 barrels per day (115.63 moles per hour); and, the fresh feed to the third reaction zone is 550 barrels per day (91.08 moles per hour).

Prior to entering the first reaction zone, the fresh benzene feed is admixed with 1590.82 moles per hour of a hydrogen-rich make-up gaseous phase from a catalytic reforming unit (comprising 1066.33 moles of hydrogen and 1.43 moles of benzene), a recycle cyclohexane concentrate in an amount of 173.62 moles per hour, and an internally recycled hydrogen-rich stream in an amount of 2066.29 moles per hour. Following suitable heat-exchange with various hot effluent streams, the total feed to the first reaction zone is at a temperature of about 290°F., as measured at the inlet to the catalyst bed. The pressure imposed upon the first reaction zone is 490 psig. The reaction zone effluent is at a temperature of about 480°F. and a pressure of about 480 psig.

The total effluent from the first reaction zone is utilized as a heat-exchange medium, in a steam generator, whereby the temperature is reduced to a level of about 330°F. The cooled effluent is admixed with 115.63 moles per hour of fresh benzene feed (at 100°F.); the resulting temperature is 290°F., and the mixture enters the second reaction zone at a pressure of about 470 psig. The second reaction zone effluent, at a pressure of 460 psig. and a temperature of 472°F., is also utilized as a heat-exchange medium to generate steam, whereby the temperature is reduced to a level of about 320°F. Upon being admixed with 91.08 moles/hr. of fresh benzene feed, the temperature is again 290°F., and the mixture enters the third reaction zone at a pressure of about 450 psig. The third reaction zone effluent is at a temperature of about 429°F. and a pressure of 440 psig. Again, through utilization as a heat-exchange medium, the temperature is reduced to a level of 236° F., and subsequently reduced to a level of about 120°F. by use of an aircooled condenser. The cooled third reaction zone effluent is introduced into a high pressure separator, at a pressure of about 400 spig.

A hydrogen-rich vaporous phase is withdrawn from the high pressure separator and recycled by way of compressive means at a pressure of about 490 psig., to the inlet of the first reaction zone. A portion of the normally liquid phase, withdrawn from the high pressure separator, is recycled to the first reaction zone as the cyclohexane concentrate hereinbefore described. The remainder of the normally liquid phase is passed into a stabilizing column functioning at an operating pressure of 260 psig., a top temperature of about 160°F. and a bottom temperature of about 430°F. The cyclohexane product is withdrawn from the stabilizer as a bottom stream, and the overhead stream is combined with the vent gas withdrawn from the high pressure separator for pressure control purposes, the mixture being subjected to refrigerated cooling to separate light normally liquid hydrocarbons. The cyclohexane concentrate is recovered in an amount of about 321.49 moles per hour, of which only 0.16 moles per hour constitutes other hexanes. The following Table I presents the component analysis of the overall vent gas stream and the light hydrocarbon product stream recovered from the refrigerated cooler.

TABLE I

Analysis, Vent Gas & Recovered Liquid

| Component, moles/hr. | Gas | Liquid |
|---|---|---|
| Hydrogen | 99.93 | — |
| Methane | 252.30 | — |
| Ethane | 158.92 | — |
| Propane | 85.59 | — |
| Butanes | — | 28.48 |
| Pentanes | — | 2.92 |
| Hexanes | — | — |
| Benzene | — | 0.76 |
| Cyclohexane | — | 0.76 |

By way of brief summation, the fresh benzene feed is in an amount of 1940 barrels per day, or 25,049 lbs./hr., or 320.69 moles per hour. The cyclohexane product stream is 2367 barrels per day, 27,055 lbs. per hour, or 321.49 moles per hour, including 0.16 moles per hour of other hexanes.

DEHYDROGENATION EXAMPLE

A mixture of long-chain normal paraffins, containing from 11 to 14 carbon atoms per molecule, were dehydrogenated to normal paraffins utilizing five alumina-based catalysts of varying metal concentrations. The operations were effected at a pressure of about 30.0 psig., a space velocity of 32.0, an $H_2/HC$ mole ratio of 8.0:1.0 and at four different reaction zone temperatures. The following Table II indicates the percentage of normal mono-olefins in the product:

TABLE II

Normal Paraffin Dehydrogenation

| Metal Component | Percentage Concentration | | | | |
|---|---|---|---|---|---|
| Platinum | 0.5 | 1.0 | 0.5 | 0.3 | 0.375 |
| Rhenium | 0 | 0 | 0.5 | 0.3 | 0.375 |
| Lithium | 0.6 | 0.6 | 0.8 | 0.6 | 0.6 |
| Temperature, °C. | Normal Product Olefins, % | | | | |
| 460 | 8.3 | 7.9 | 10.5 | 9.1 | 10.0 |
| 465 | 6.7 | 7.6 | 11.4 | 9.9 | 10.8 |
| 470 | 6.0 | 7.1 | 11.6 | 10.6 | 11.3 |
| 475 | 6.2 | 7.1 | 12.0 | 11.2 | 11.7 |

Upon comparing the catalysts containing platinum and lithium, with the catalysts containing platinum, rhenium and lithium, it is immediately noted that the latter, in all cases, was significantly more active. For example, comparing the catalyst of 1.0% Pt/0.6% Li, with the 0.375% Pt/0.375% Re/0.6% Li catalyst, the latter, at 460°C. shows a 26.6% yield increase; at a temperature of 475°C., the yield increase afforded with the rhenium-containing catalyst is a surprising 64.8%. In fact, these data indicate a totally unexpected result to the effect that the activity of the non-rhenium catalyst steadily decreases with increased temperature, while the activity of the rhenium-containing catalyst increases. As will be recognized by those possessing the requisite skill, this synergism alludes also to catalyst stability.

The foregoing clearly illustrates the present invention and the benefits afforded through the utilization thereof in the dehydrogenation and hydrogenation of hydrocarbons.

I claim as my invention:

1. A non-acid-acting catalytic composite of alumina carrier, a Group VIII noble metal, an alkalinous metal selected from the group consisting of lithium, sodium, potassium, rubidium, cesium, beryllium, magnesium, calcium, strontium, barium and mixtures thereof, and a Group VII-B metal having an atomic number greater than 25, said composite containing on an elemental basis Group VIII noble metal in an amount of from 0.01% to about 2.0% by weight, Group VII-B metal in an amount of 0.01% to about 2.0% by weight and alkalinous metal in an amount of 0.01% to about 1.5% by weight.

2. The composite of claim 1 further characterized in that said Group VIII metal is platinum or palladium, said Group VII-B metal is rhenium and said alkalinous metal is lithium or potassium.

3. The composite of claim 1 further characterized in that the weight ratio of said Group VII-B metal to said Group VIII noble metal is in the range of about 0.01:1 to about 2.5:1 calculated on an elemental basis.

* * * * *